(12) United States Patent
Man (10) Patent No.: US 11,045,046 B1
(45) Date of Patent: Jun. 29, 2021

(54) DOUBLE AIR FRYER OVEN

(71) Applicant: Zhejiang Biyi Electric Appliance Co. Ltd., Yuyao (CN)

(72) Inventor: Kaimong Man, Yuyao (CN)

( * ) Notice: Subject to any disclaimer, the term of this patent is extended or adjusted under 35 U.S.C. 154(b) by 0 days.

(21) Appl. No.: 17/168,462

(22) Filed: Feb. 5, 2021

(51) Int. Cl.
*A47J 37/06* (2006.01)

(52) U.S. Cl.
CPC ....... *A47J 37/0641* (2013.01); *A47J 37/0664* (2013.01)

(58) Field of Classification Search
CPC ........ A47J 37/0641; A47J 27/00; A47J 27/08; A47J 27/09; A47J 27/092; A47J 36/025; A47J 36/06; A47J 36/08; A47J 36/10; A47J 36/12; A47J 36/165; A47J 36/18; A47J 36/20; A47J 36/22; A47J 37/00; A47J 37/12; A47J 37/1204; A47J 37/1209; A47J 37/1214; A47J 37/1219; A47J 37/1266; A47J 37/1285; A47J 37/129; A47J 37/1295
USPC .......... 99/324, 325, 330–343, 369, 400–418, 99/422, 425, 426, 430, 440, 444, 447, 99/448, 449, 451, 483, 495, 501
See application file for complete search history.

(56) References Cited

U.S. PATENT DOCUMENTS

| | | | |
|---|---|---|---|
| 2009/0126580 A1* | 5/2009 | Hartfelder | A47J 39/006 99/483 |
| 2017/0231430 A1* | 8/2017 | Moon | A47J 37/1266 99/331 |

* cited by examiner

*Primary Examiner* — Phuong T Nguyen
(74) *Attorney, Agent, or Firm* — Frank Marino (57) ABSTRACT

The application example provides one kind of air fryer, which relates to the technical field of household appliances. The air fryer includes a body, a pot body component and a movable partition. The body comprises a body shell, a heating chamber and a heating component. The heating chamber and the heating component are arranged inside the body shell, and the heating component is arranged on the heating chamber. The movable partition is detachably installed in the middle position of the heating chamber, and the movable partition divides the heating chamber into the first heating chamber and the second heating chamber; the pot body component is detachably installed inside the heating chamber. The air fryer can realize the technical effect of improving practicability and convenience.

4 Claims, 9 Drawing Sheets

DOUBLE AIR FRYER OVEN

FIELD OF THE INVENTION

This application relates to the technical field of household appliances, and specifically to an air fryer.

BACKGROUND

At present, the air fryer is a machine that can use air to "fry". It mainly uses air to replace the hot oil in the original frying pan to make the food cooked; at the same time, the hot air blows away the moisture on the surface of the food to make the ingredients reach the effect of frying. The working principle of air fryer is high-speed air circulation technology, it produces hot air by heating a heating pipe inside the machine at high temperatures. Then the motor blows the high temperature air into the pot to heat the food, so that the hot air circulates in the closed space, and the food is fried with the oil of the food itself, so that the food is dehydrated and the surface becomes golden and crisp, so as to achieve the effect of frying.

In the existing technology, the existing air fryers on the market are either double-pot structure or single-pot structure; Double pot can cook two kinds of different food. It is difficult to be practical in case of larger food or large amount of food because of the small volume of each pot body; While a single pot can only cook one kind of food, and it will waste time when meeting many kinds of food.

SUMMARY

The purpose of this application embodiment is to provide an air fryer which can achieve the technical effect of improving practicability and convenience.

The embodiment of the application provides an air fryer, which comprises a body, a pot body component and a movable partition; The body comprises a body shell, a heating chamber and a heating component. The heating chamber and the heating component are arranged inside the body shell, and the heating component is arranged on the heating chamber.

The movable partition is detachably installed in the middle position of the heating chamber, and the movable partition divides the heating chamber into a first heating chamber and a second heating chamber;

The pot body component is detachably installed inside the heating chamber.

In the above process, the air fryer divides the heating chamber into two parts by setting a detachable movable partition in the heating chamber: the first heating chamber and the second heating chamber; when a double pot air fryer is needed, the movable partition separates the heating chamber, and the small pots in the pot component can be placed in the first heating chamber and the second heating chamber respectively; When a single pot air fryer is needed, the movable partition is removed, and the heating chamber becomes an integrated chamber again, and the large pot body in the pot body component can be directly placed in the heating chamber; The air fryer can be freely switched between the single pot configuration and the double pot configuration through the above way, which is suitable for different conditions of food cooking, so as to realize the technical effect of improving the practicability and convenience.

Furtherly, the pot body component includes a first pot body and a second pot body. And the movable partition is installed in the middle position of the heating chamber, the first pot body is detachably installed in the first heating chamber. and the second pot is detachably installed in the second heating chamber. In the above process, when a double pot air fryer is needed, the movable partition can be installed in the middle of the heating chamber, and the first and second pot body can be placed in the first heating chamber and the second heating chamber respectively.so as to transform the air fryer into double pot body configuration.

Furtherly, the pot body component also includes a third pot body that is detachably installed in the heating chamber.

In the above process, when a single-body air fryer is needed, the movable partition can be detached from the middle position of the heating chamber and the third body can be placed in the heating chamber to convert the air fryer into a single-body configuration.

Furtherly, the heating chamber comprises a base, which is provided with a first sliding guide rail. The heating component is provided with a second sliding guide rail, the movable partition is respectively connected with the first sliding guide rail and the second sliding guide rail.

In the above process, the movable partition can slide between the first sliding guide rail and the second sliding guide rail, which makes the installation and disassembly of the movable partition convenient, and easily realizes the free switch between the single-pot configuration and the double-pot configuration of the air fryer.

Furtherly, the first sliding rail is arranged in parallel with the second sliding rail.

In the above process, in order to realize the smooth sliding effect of the movable partition on the first sliding guide rail and the second sliding guide rail, and to facilitate the disassembly, the first sliding guide rail and the second sliding guide rail can be set in parallel.

Furthermore, the second sliding guide rail is provided with a movable buckle, the edge of the movable partition is provided with a card slot. The movable buckle and the card slot are mutually inserted.

In the above process, when the movable partition slides in place, the movable buckle can buckle the movable partition through the slot on the movable partition to prevent the movable partition from falling out.

Furtherly, the air fryer also includes a thermal barrier, which is arranged between the heating component and the heating chamber. In the above process, the thermal barrier can realize heat insulation to the air fryer, so as to achieve a better cooking effect. Furtherly, the heating component includes a heating tube and a motor, and the heating tube is arranged between the motor and the heating chamber. In the above process, the heating tube can heat air, and the motor blows the hot air heated by the heating tube to the heating chamber, so as to achieve the heating effect of the food in the heating chamber.

Furtherly, the heating component comprises a first heating component and a second heating component, the first heating component is arranged on the first heating chamber, and the second heating component is arranged on the second heating chamber.

In the above process, the first heating chamber and the second heating chamber are respectively provided with heating components to facilitate the separate cooking of the first heating chamber and the second heating chamber, which are independent of each other and have higher universality.

Furtherly, the pot body component is provided with a handle.

In the above process, in order to facilitate the holding of the pot body component, a handle can be set on the pot body component to improve the practicability.

The other features and advantages of this disclosure will be described in subsequent instructions, or some of them may be inferred from the instructions or determined without doubt, or can be learned by implementing the above-mentioned technology of this disclosure.

In order to make the above purposes, features and advantages of this application more obvious and understandable, a good example of this application is given below and illustrated in detail with the attached drawings.

DESCRIPTION OF THE DRAWINGS

In order to explain the technical solutions of the application example more clearly, the following will briefly introduce the drawings that need to be used in the application example. It should be understood that the following drawings only show some example of the application. Therefore, it should not be regarded as a limitation of the scope. For ordinary technicians in the field, other relevant drawings can be obtained based on these drawings without creative work.

DESCRIPTION OF AN EMBODIMENT

A clear and complete description of the technical solutions in the application example will be given below in combination with the drawings attached to the application drawings. Obviously, the examples described are only part of the application examples and not all of those. The components of this application examples generally described and shown in the attached drawings here may be arranged and designed in a variety of configurations. Therefore, the following detailed description of the application examples provided in the drawings is not intended to limit the scope of the application claimed, but merely represents selected examples of the application.

Based on the application examples, all other examples obtained by technician in the field without having done any creative work are covered by this application.

In this application, the term "up", "down", "left" and "right" and "before" and "after", "top", "bottom", "inside" and "outside", "in", "vertical", "level", "horizontal" and "vertical" indicates a location or position relations based on the location or position shown in the appended drawings. These terms are primarily intended to better describe this application. It is not intended to limit that the indicated device, element or component must have a specific orientation, or be constructed and operated in a specific orientation.

Besides, some of the above terms may be used to indicate other meanings in addition to the orientation or position relationship. For example, the term "up" may also be used to indicate a certain attachment relationship or connection relationship in some cases. For those technicians in the field, the specific meanings of these terms in this application can be understood according to specific circumstances.

In addition, the terms "installation", "setup", "provided", "connected" and "link" should be understood broadly. For example, it can be fixed, removable, or one-piece construction; It can be mechanical connection, or point connection; It may be a direct connection, or an indirect connection through an intermediary, or an internal connection between two devices, components or components. For ordinary technicians in the field, the specific meaning of the above terms in this application may be understood according to specific circumstances.

In addition, the terms "first" and "second" are mainly used to distinguish different devices, elements or components (specific types and structures may be the same or different), not to indicate or imply the relative importance and quantity of the devices, elements or components. Unless otherwise specified, "multiple" means two or more.

The application examples provide one kind of air fryer, which can be used in the cooking process; The heating chamber is divided into two parts by arranging a detachable movable partition in the air fryer: The first heating chamber and the second heating chamber; When a double-body air fryer is needed, the heating chamber is separated by a movable partition. The small pot body in the pot body component can be placed in the first heating chamber and the second heating chamber respectively. When a single-body air fryer is needed, remove the movable partition and the heating chamber becomes a integrated chamber again. The large pot body in the pot body component can be directly placed in the heating chamber. Through the above method, the air fryer can be freely switched between a single-pot body configuration and a double-pot body configuration, respectively suitable for food cooking under different conditions, so as to achieve the technical effect of improving practicability and convenience.

Figure 1:
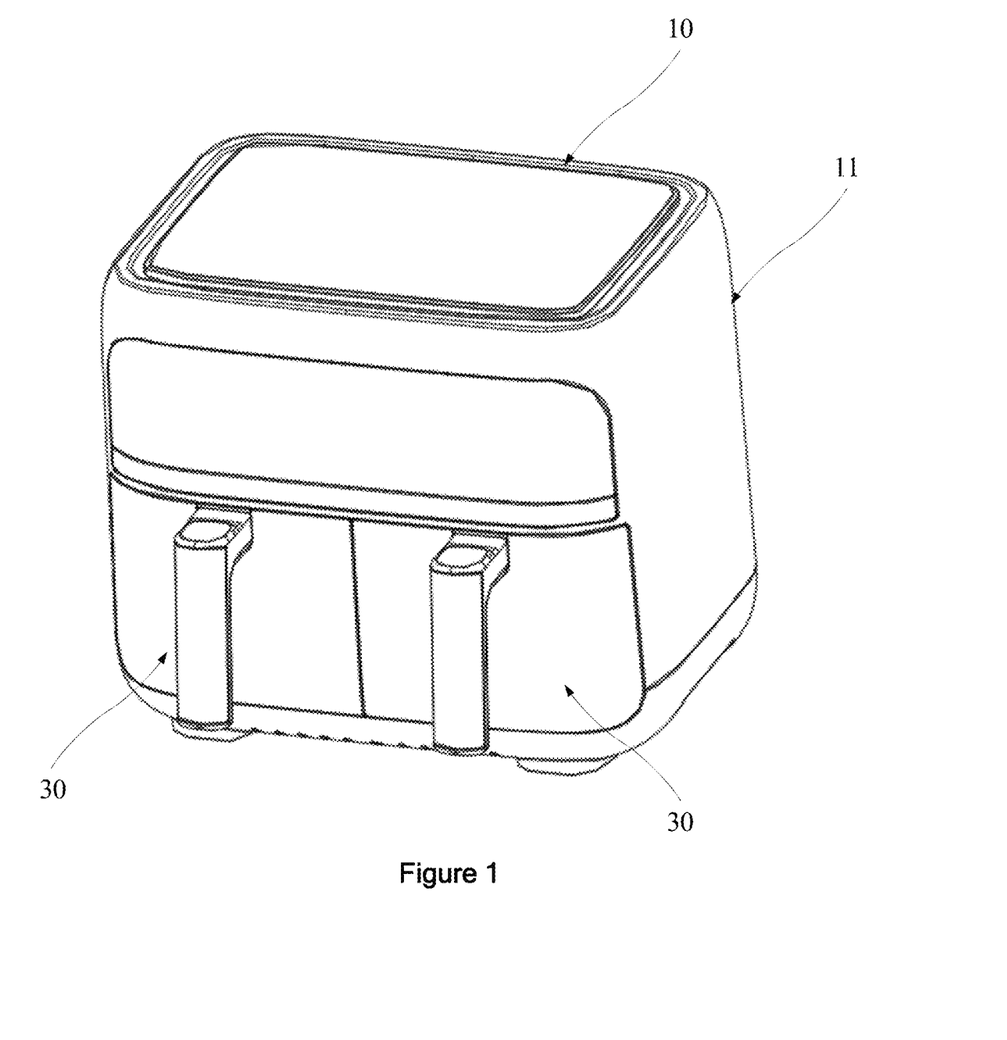
FIG. 1 is a structural diagram of one kind of air fryer with double-body configuration provided in this application example.
Figure 2:
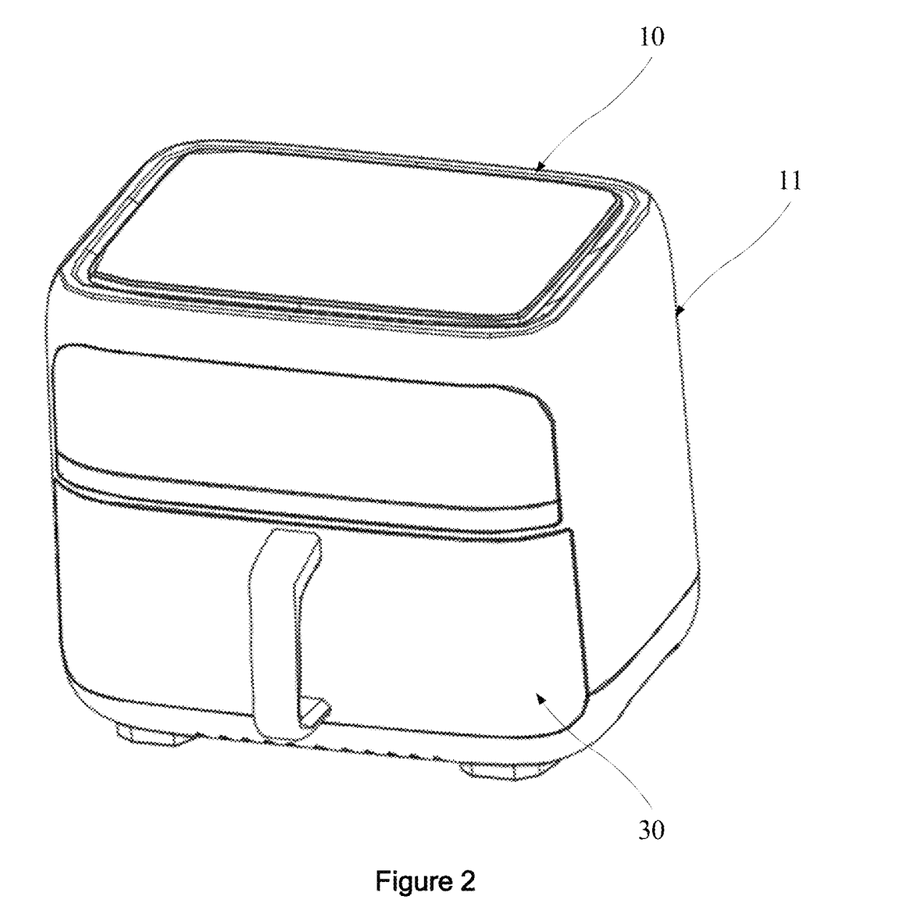
FIG. 2 is a structural diagram of one kind of air fryer with single-body configuration provided in this application example.
Figure 3:
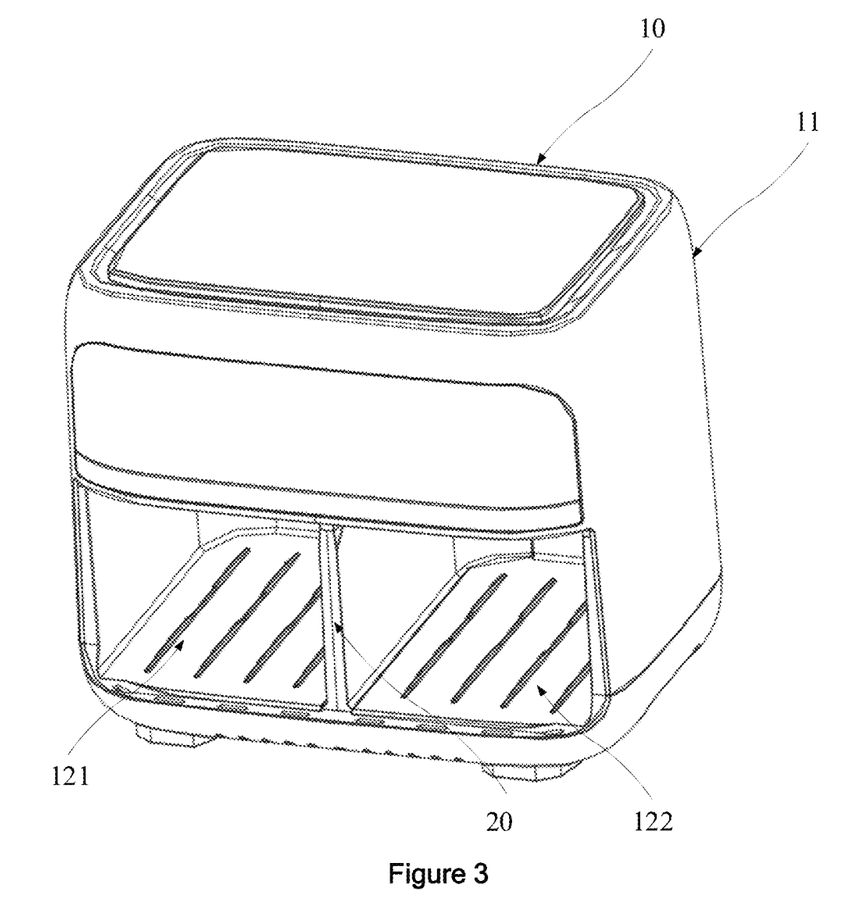
FIG. 3 is a structural diagram of another kind of air fryer with double-body configuration provided in this application example.
Figure 4:
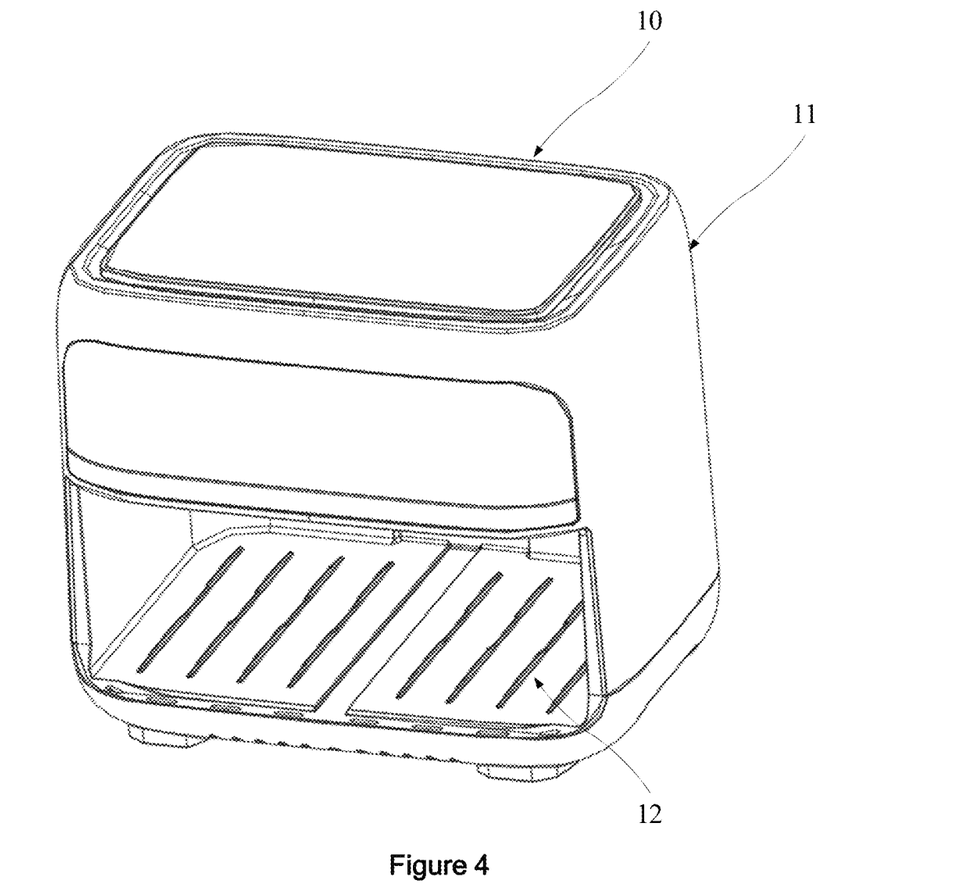
FIG. 4 is a structural diagram of another kind of air fryer with single-body configuration provided in this application example.

Please refer to FIG. 1 to FIG. 4. FIG. 1 is a structural diagram of one kind of air fryer with double-body configuration provided in this application example; FIG. 2 is a structural diagram of one kind of air fryer with single-body configuration provided in this application example; FIG. 3 is a structural diagram of another kind of air fryer with double-body configuration provided in this application example; FIG. 4 is a structural diagram of one kind of air fryer with double-body configuration provided in this application example; FIG. 1 is corresponding to FIG. 3. FIG. 3 is the diagram of the air fryer when the body components are removed. FIG. 2 is corresponding to FIG. 4. FIG. 4 shows the diagram of the air fryer when the pot body components are removed. The air fryer comprises the body 10, the movable partition 20 and the pot body component 30.

For example, the body 10 includes a body shell 11, a heating chamber 12 and a heating component, the heating chamber 12 and the heating component 13 are arranged inside the body shell 11, and the heating component is arranged on the heating chamber 12.

For example, the movable partition 20 is detachably installed in the middle of the heating chamber 12, and the movable partition 20 divides the heating chamber 12 into the first heating chamber 121 and the second heating chamber 122.

For example, the pot body component 30 is detachably installed in the heating chamber 12.

Alternatively, the pot body component includes a small pot adapted to the first heating chamber 121 and the second heating chamber 122, and a large pot adapted to the heating chamber 12.

In some implementation scenarios, an air fryer is configured with two pots, a double-pot configuration and a single-pot configuration. Double pot configuration can cook two different kinds of food at the same time, convenient and time-saving. Single pot configuration, you can cook some larger food (such as whole chicken). Or cook more food (such as dehydrated fruit).

In some implementation mode, the air fryer divides the heating chamber 12 into two parts: the first heating chamber 121 and the second heating chamber 122 by installing a detachable movable partition 20 in the heating chamber 12; When a double-body air fryer is needed, the movable partition 20 separates the heating chamber 12. The small pot body in the pot body component 30 can be placed in the first heating chamber 121 and the second heating chamber 122 respectively. When a single body air fryer is needed, remove the movable partition 20 and the heating chamber 12 becomes an integrated chamber again. The large pot body in the pot body component 30 can be directly placed in the heating chamber 12. Through the above method, the air fryer can be freely switched between the single-pot body configuration and the double-pot body configuration, respectively suitable for food cooking under different conditions, so as to achieve the technical effect of improving practicability and convenience.

In some implementation mode, the pot body component 30 includes the first pot body 31 and the second pot body 32. When the movable partition 20 is installed in the middle of the heating chamber 12, the first pot body 31 is removably installed in the first heating chamber 121 and the second pot body 32 is removably installed in the second heating chamber 122.

For example, when a double-body air fryer is needed, the movable partition 20 can be installed in the middle of the heating chamber 12, and the first body pot 31 and the second body pot 32 can be placed in the first and second heating chambers 121 and 122 respectively to convert the air fryer into a double-body configuration.

In some implementation the pot body component 30 also includes the third pot body 33 which is removably installed in the heating chamber 12.

For example, when a single-body air fryer is needed, the movable partition 20 can be removed from the middle of the heating chamber 12 and the third body pot can be placed in the heating chamber 12 to convert the air fryer to a single-body configuration.

Figure 5:
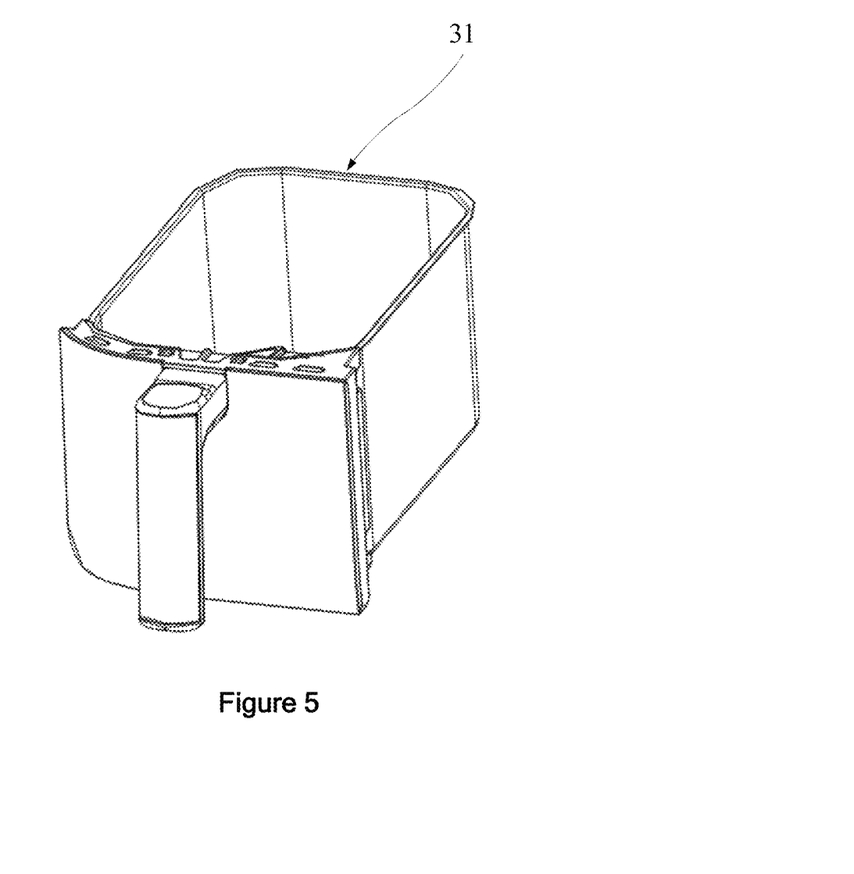
FIG. 5 is a structural diagram of the first pot body provided in this application example.
Figure 6:
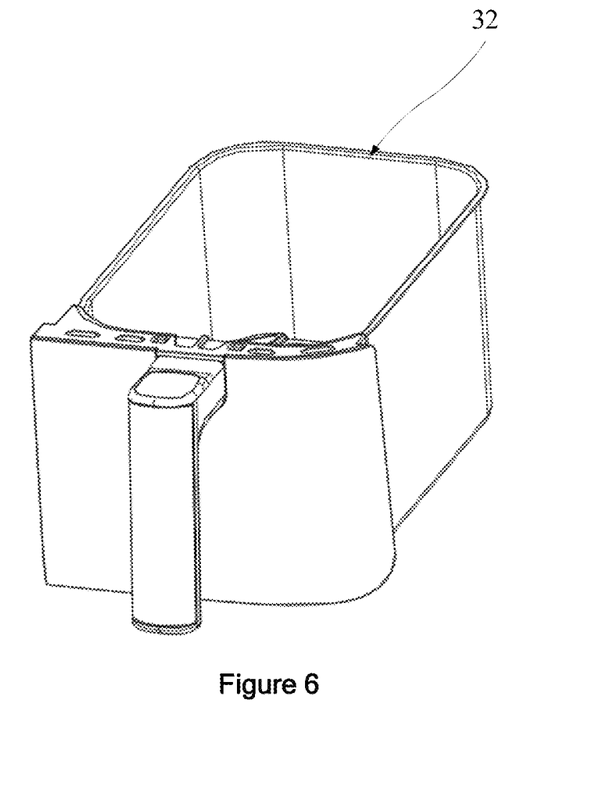
FIG. 6 is a structural diagram of the second pot body provided in this application example.
Figure 7:
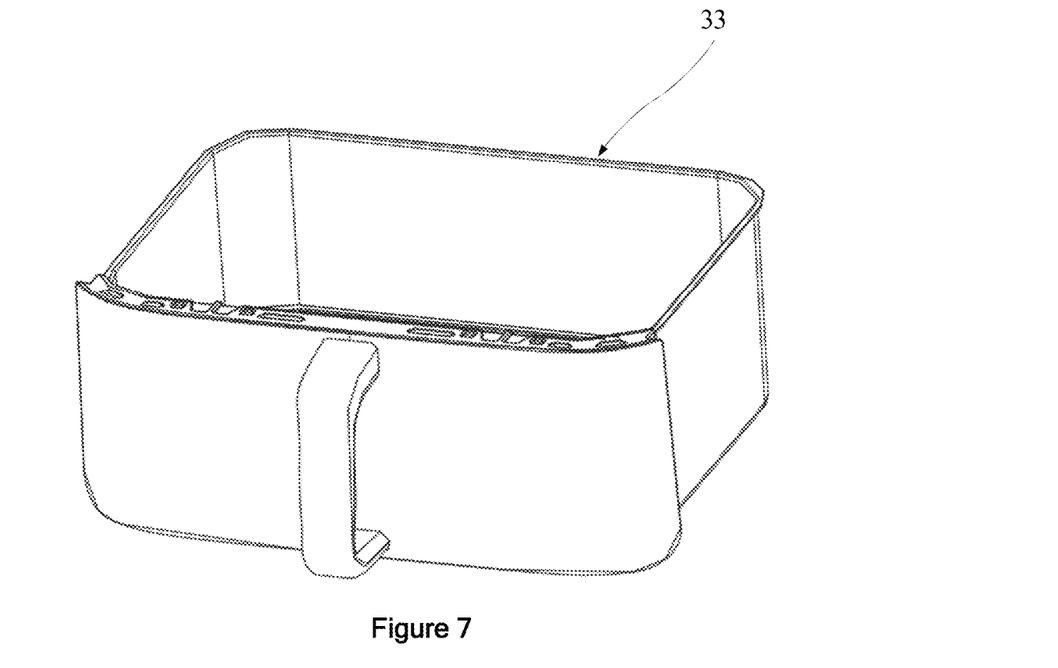
FIG. 7 is a structural diagram of the third pot body provided in this application example.

Please refer to FIG. 5 to FIG. 7. FIG. 5 is the structural diagram of the first pot body provided by this application examples; FIG. 6 is the structural diagram of the second pot body provided by this application examples; FIG. 7 is the structural diagram of the third pot body provided by this application examples.

In some implementation mode, the first pot 31 and the second pot 32 are symmetrically arranged, and the first pot 31 and the second pot 32 are mirror-symmetrical structures. In some implementation mode, the pot body component 30 is provided with a handle. For example, in order to facilitate the holding of the pot body component 30, a handle can be provided on the pot body component 30 to improve practicality.

Figure 8:
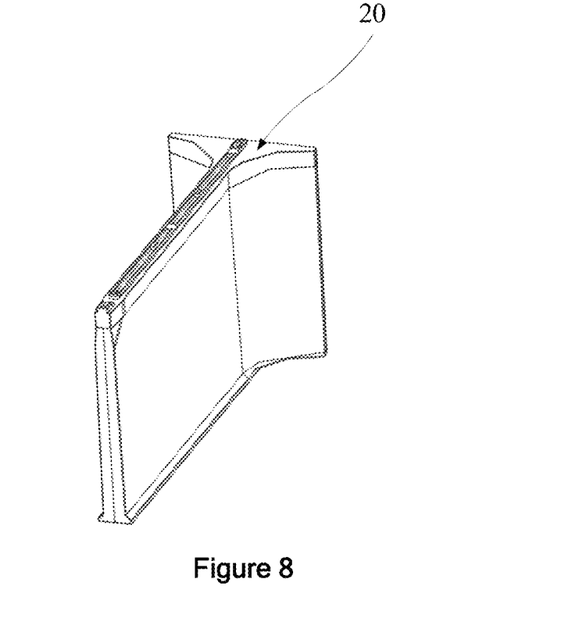
FIG. 8 is a section diagram of the movable partition provided in this application example
Figure 9:
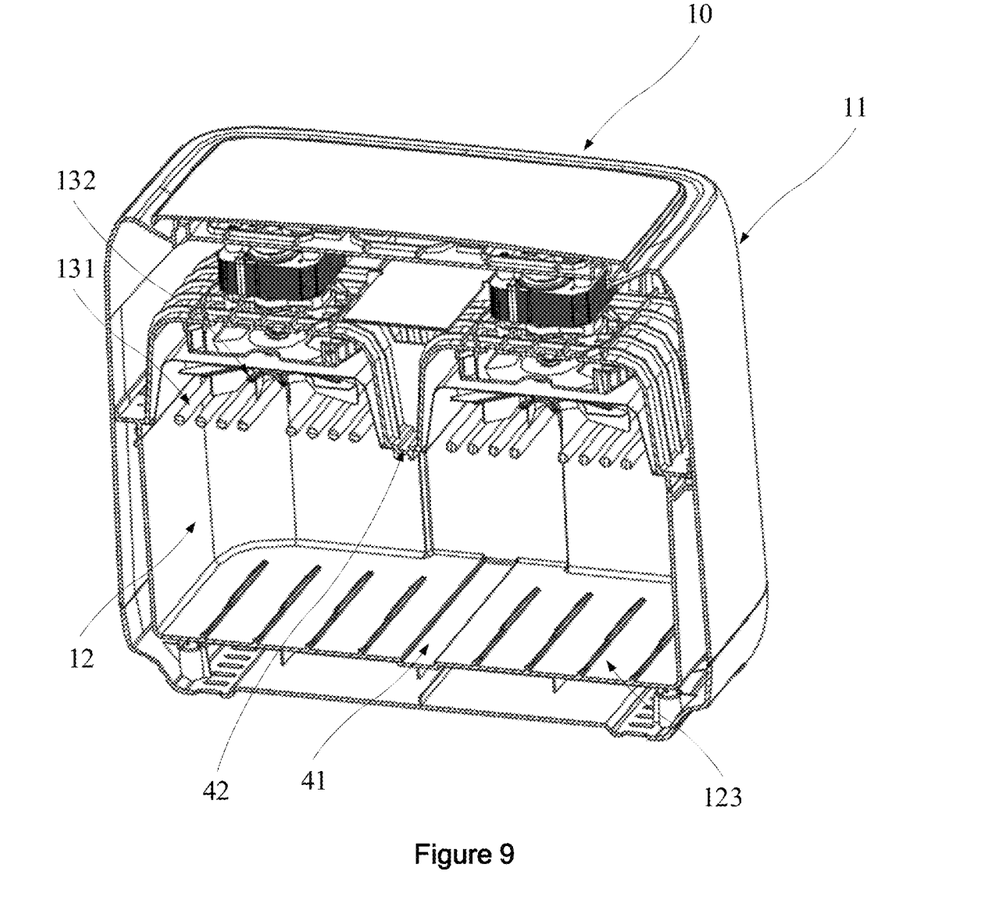
FIG. 9 is a section diagram of one kind of air fryer provided in this application example.
Figure 10:
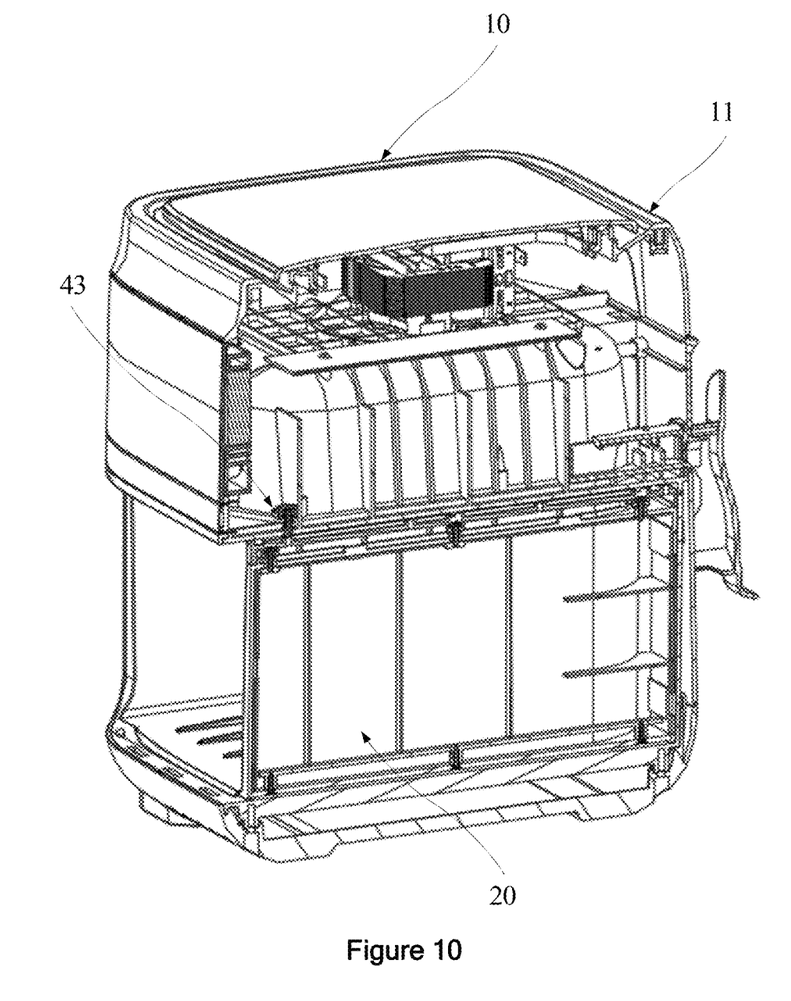
FIG. 10 is a section diagram of another kind of air fryer provided in this application example

Please refer to FIG. 8 to FIG. 10. FIG. 8 is the sectional diagram of the movable partition provided by the application examples, FIG. 9 is the sectional diagram of one kind of air fryer provided by the application examples, and FIG. 10 is the sectional diagram of another kind of air fryer provided by the application examples, which includes a heating component 13.

For example, the heating chamber 12 includes a base 123, on which a first sliding guide rail 41 is arranged, and a second sliding guide rail 42 is arranged on the heating component 13, and the movable partition 20 is sliding connected with the first sliding guide rail 41 and the second sliding guide rail 42 respectively.

For example, the movable partition 20 can slide between the first sliding guide rail 41 and the second sliding guide rail 42, which makes the installation and disassembly of the movable partition 20 convenient and easily realizes the free switch between the single body configuration and the double body configuration of the air fryer.

For example, the first sliding guide rail 41 is arranged in parallel with the second sliding guide rail 42.

For example, in order to achieve the smooth sliding effect of the movable partition 20 on the first sliding guide rail 41 and the second sliding guide rail 42, and to facilitate disassembly, the first sliding guide rail 41 and the second sliding guide rail 42 can be set in parallel.

For example, the second sliding guide rail 42 is provided with a movable buckle 43, the edge of the movable partition 20 is provided with a card slot, and the movable buckle 43 and the slot are mutually inserted.

For example, when the movable partition 20 slides in place, the movable buckle 43 can buckle the movable partition 20 through the slot on the movable partition 20 to prevent the movable partition 20 from falling out.

For example, the air fryer also includes thermal barrier arranged between the heating component 13 and the heating chamber 12.

For example, the thermal barrier can do heat insulation for the air fryer, so as to achieve a better cooking effect on the food.

For example, the heating component 13 includes a heating tube 131 and a motor 132. The heating tube 131 is arranged between the motor 132 and the heating chamber 12.

For example, heating tube 131 can heat the air, and motor 132 blows the hot air heated by heating tube 131 to heating chamber 12, so as to realize the heating effect of food in heating chamber 12.

For example, the heating component comprises the first heating component arranged on the first heating chamber 121 and the second heating component arranged on the second heating chamber 122.

For example, the first heating chamber 121 and the second heating chamber 122 are respectively provided with heating components to facilitate the cooking of the first heating chamber 121 and the second heating chamber 122 respectively, which are independent of each other and have higher universality.

In all of this application examples, "big" and "small" are relative, "much" and "little" are relative, and "upper" and "lower" are relative. The expression of such relative terms will not be repeated in this application example.

It should be understood that references throughout the instructions to "in this example", "in this application example" or "as an optional implementation mode" mean that a particular characteristic, structure or feature relevant to the example is included in at least one application example. Therefore, references to "in this example", "in this application example" or "as an optional implementation mode" throughout the instruction do not necessarily refer to the same example. Furthermore, these particular characteristic, structures or feature may be combined in one or more examples in any appropriate ways. Technicians in the field should also be aware that the examples described in the instruction are optional examples and that the actions and modules involved are not necessarily required for the application.

In the various application examples, it shall be understood that the number of the above procedures does not necessarily imply the order of execution, and that the sequence of procedure execution shall be determined by their function and internal logic and shall not constitute any limitation on the execution of the application example.

The above is only the specific implementation method of this application, but the protection scope of this application is not limited to it. Any technician familiar with the technical field who can easily think of changes or substitutions within the scope of the technology disclosed in this application shall be covered within the protection scope of this application. Therefore, the protection scope of this application shall be the same as that of the claim.

I claim:

1. An air fryer, comprising a body, a pot body component and a removable partition; wherein the body comprises a body shell, a heating chamber and a heating component; wherein the heating chamber and the heating component are arranged inside the body shell, and the heating component is arranged on the heating chamber; and wherein the removable partition is detachably installable in the middle of the heating chamber, and the removable partition, when installed, divides the heating chamber into a first heating chamber portion and a second heating chamber portion; and a first pot body is detachably installable inside the heating chamber when the removable partition is removed; and second and third pot bodies, each smaller than the first pot body and both detachably installable, alternatively to the first pot body, inside the heating chamber portions with the removable partition there-between, wherein the heating chamber includes a base on which a first sliding guide rail is arranged, and a second sliding guide is arranged on the heating component, and the removable partition is connectable with the first sliding guide and the second sliding guide respectively; wherein the second sliding guide rail is provided with a movable buckle, the edge of the removable partition is provided with a card slot, and the movable buckle and the card slot are mutually insertable; wherein the heating component includes a heating pipe and a motor, and the heating pipe is arranged between the motor and the heating chamber; and wherein the second and third pot bodies each have rounded rear corners and the removable partition comprises a vertical flat wall with outwardly curved rear surfaces which partially surround the rounded rear corners when the second and third pot bodies and the removable partition are installed.

2. The air fryer according to claim 1, wherein the first sliding guide rail is parallel to the second sliding guide rail.

3. The air fryer according to claim 1, wherein the heating component comprises a first heating component and a second heating component; and wherein the first heating component is arranged in the first heating chamber portion and the second heating component is arranged in the second heating chamber portion.

4. The air fryer according to claim 1, wherein the pot bodies are provided with handles.

* * * * *